United States Patent [19]
Blomgren et al.

[11] Patent Number: 5,455,909
[45] Date of Patent: Oct. 3, 1995

[54] MICROPROCESSOR WITH OPERATION CAPTURE FACILITY

[75] Inventors: James S. Blomgren; Jimmy Bracking; David Richter, all of San Jose; Francis Spahn, El Cerrito, all of Calif.

[73] Assignee: Chips and Technologies Inc., San Jose, Calif.

[21] Appl. No.: 872,913

[22] Filed: Apr. 22, 1992

Related U.S. Application Data

[63] Continuation-in-part of Ser. No. 726,306, Jul. 5, 1991, Pat. No. 5,274,791, and a continuation-in-part of Ser. No. 767,239, Sep. 27, 1991, Pat. No., Ser. No. 770,043, Oct. 1, 1991, Pat. No. 5,297,989, and Ser. No. 762,630, Sep. 19, 1991.

[51] Int. Cl.⁶ .................................................. G06F 11/00
[52] U.S. Cl. .................... 395/183.19; 395/775; 395/825; 395/869; 395/856; 364/259.3; 364/259.7; 364/264.1; 364/265; 364/265.5; 364/DIG. 1
[58] Field of Search ...................................... 395/275, 425, 395/785

[56] References Cited

U.S. PATENT DOCUMENTS

| 4,420,806 | 12/1993 | Johnson, Jr. et al. | 364/200 |
| 4,591,982 | 5/1986 | Buonomo et al. | 364/200 |
| 4,709,324 | 11/1987 | Kloker | 364/200 |
| 4,736,290 | 4/1988 | McCallion | 364/200 |
| 5,027,273 | 6/1991 | Letwin | 364/200 |
| 5,274,791 | 12/1993 | Bracking et al. | 395/425 |
| 5,274,826 | 12/1993 | Kardach et al. | 395/725 |

Primary Examiner—Christopher B. Shin
Attorney, Agent, or Firm—Elmer Galbi

[57] ABSTRACT

The present invention provides a microprocessor with a special Operation Capture Facility (OCF) mechanism which enables "faulting" whenever there is (a) a memory access request to any one of a specified plurality of blocks of memory (b) a request to access any one of a plurality of specified I-O ports or (c) any one of a specified plurality of interrupts is activated. This OCF mechanism includes a plurality of special registers which store either (a) an I-O port address, (b) a memory address or (c) an interrupt number. Mask registers are provided which (1) mask bits in the special register, thereby providing the ability to fault on an entire block of I-O access requests or upon activation of any one of a block of interrupts and (2) indicate which type of interrupts should be faulted and to indicate whether I-O should be faulted on a byte, word or double word.

5 Claims, 4 Drawing Sheets

MICROPROCESSOR WITH OPERATION CAPTURE FACILITY

RELATED APPLICATIONS

The present application is a continuation in part of the following applications:

a) Ser. No. 07/726,306 filed Jul. 5, 1991 entitled "Microprocessor with OEM Mode for Power Management", now patented U.S. Pat. No. 5,274,791;

b) Ser. No. 07/767,239 filed Sep. 27, 1991 entitled "Microprocessor with Customization Mode";

c) Ser. No. 07/770,043 filed Oct. 10, 1991 entitled "Arithmetic Logic Unit for Microprocessor with Sign Bit Extended", now patented U.S. Pat. No. 5,227,989; and d) Ser. No. 07/762,630 filed Sep. 19, 1991 entitled "A System for Performing Input and Output Operations to and from a Processor".

FIELD OF THE INVENTION

The present invention relates to high density electronic integrated circuitry and more particularly to single chip microprocessors.

BACKGROUND OF THE INVENTION

A wide variety of single chip microprocessors are commercially available. Many of the widely used single chip microprocessors are part of the iAPX 86 family of microprocessors. The iAPX 86 family of microprocessors is used in what is generally termed "IBM compatible" personal computers made and sold by IBM and by a wide variety of other companies. Microprocessors termed the 8086, 80286, 80386 and 80486 are part of the iAPX 86 family. Microprocessors in the iAPX 86 family are commercially available from a large number of vendors including Nippon Electric Corporation (NEC), Advanced Micro Devices Corporation (i.e. AMD), Chips and Technologies Inc., Cyrix Inc, and Intel Corporation.

The 386 microprocessor is a relatively recent addition to the iAPX 86 family. It is generally understood in the industry that the number "386" applied to a microprocessor designates a microprocessor which has a particular type of architecture hereinafter termed the "standard 386" architecture. The standard 386 architecture includes significant functions which were not available in the earlier members of the iAPX 86 family.

The standard 386 architecture defines three modes of operation generally termed, (1) "Virtual 8086 mode", (2) "Protected Virtual Address mode" which is often referred to as "Protected" mode, and (3) "Real Address mode" which is often referred to as "Real" mode.

Virtual 8086 mode is a special compatibility mode that allows a complex 386 microprocessor to act as if it were one or more 8086 microprocessors.

Protected mode allows a standard 386 microprocessor to run several tasks simultaneously, that is, in protected mode a standard 386 can support multitasking. In order for a 386 microprocessor to operate in protected mode, several segmentation and MMU-related tables must have been previously established and these tables must be in memory when protected mode operation is initiated.

Real mode is a simplified operating mode which allows the 386 to emulate an 8086 and which can be used to establish the tables required in order for a 386 to operate in protected mode.

Protection and privilege are important parts of the 386 architecture. The standard 386 architecture defines four levels of protection or privilege. When in protected mode, programs are not allowed to read or write data that has a higher level of privilege. Furthermore, some instructions can only be executed when the processor is operating in the mode with the highest level of privilege.

A standard 386 microprocessor includes hardware that can keep track of a large number of separate, distinct tasks. A standard 386 microprocessor also has hardware that can handle the mechanics of switching between tasks. Since the hardware keeps track of the tasks being performed, the operating system can direct its attention to deciding "when" to switch tasks, rather than having to handle the mechanics of determining "how" to switch between tasks.

The present invention can be applied to many different single chip microprocessors; however, it is particularly applicable to the 386 microprocessor. Even more particularly the invention is applicable to a 386 microprocessor which has a mode of operation beyond that available in standard 386 microprocessors. One 386 microprocessor that has a mode of operation beyond that normally available in a 386 microprocessor is the "Super 386DX" microprocessor which is commercially available from Chips and Technologies Inc., San Jose, Calif.

The Super 386DX microprocessor includes an entirely new mode of operation. This new mode is termed "Superstate", "OEM mode, or "A Mode" (hereinafter referred to as OEM mode). OEM mode builds upon and extends the multitasking and protected modes available in a standard 386 microprocessor. OEM mode adds an entirely new and different set of capabilities to a standard 386 microprocessor. The previously referenced patent applications and publicly available documents from Chips and Technologies such as a publication entitled *"Super386 DX High Performance CMOS Microprocessor Data Sheet"* describe OEM mode. It is noted that what is herein referred to as OEM mode is referred to as "Superstate" in public documents from Chips and Technologies Inc.

The protected mode of operation gives a standard 386 microprocessor the type of multitasking capability that was previously available in large computer systems. The OEM mode described in the above referenced publications and copending applications adds new and additional capabilities to a 386 microprocessor. The description of OEM mode in the above referenced copending patent applications and publications is hereby incorporated herein by reference.

A standard 386 microprocessor includes two protection mechanisms for I-O operations. First, the IOPL field in the EFLAGS register allows the operating system to establish the privilege level needed to perform I/O operations. Using this mechanism, for example, the privilege level can be set such that the operating system and some device drivers can perform I-O whereas other device drivers and application programs cannot access the I-O space. Second, the Task State Segment (i.e. the TSS) which is used when a program is operating in protected mode includes a I-O permission bit map that includes a field defining I-O ports that will generate a fault prior to the particular port being accessed. When a program operating in protected mode requests an I-O operation the I-O permission bit map field in the TSS associated with the particular program is checked. The I-O operation proceeds only if the program does not find the requested port identified in the I-O permission bit map of the TSS.

If a requested port is found in the I-O permission bit map, an exception signal is generated and control passes to an exception handler program. That is, the I-O request is "faulted". (Note, "faulting" means an exception is generated before an operation proceeds. "Trapping" means that an exception is generated while or after an operation takes place). When the processor is operating on a program in real mode or in virtual mode, there is not an associated TSS which can be used to store the permission bit map. Thus, faulting using the permission bit map can only be done while the processor is operating in protected mode.

The present invention provides an improved mechanism for faulting I-O instructions. The mechanism for faulting I-O instructions provided by the present invention can be used while the processor is operating in protected mode, real mode or in virtual mode. The multimode faulting provided by the present invention contrasts to faulting using the I-O permission bit map which is only possible while the processor is operating in protected mode. Furthermore with the mechanism provided by the present invention, entire ranges of I-O ports can be easily faulted, whereas, faulting with an I-O permission bit must be done on a port-by-port basis by setting an individual bit in the I-O permission bit map for each port that is to be faulted.

In complex multitasking systems such as the 386, the conditions that cause failures can be very complex and hard to track. One prior art technique for debugging programs in a 386 microprocessor is to generate "breakpoints" or exceptions whenever the system accesses a particular instruction. This is done by replacing selected instructions with "breakpoint" instructions. The "breakpoint" instructions cause the system to take special action when the breakpoint instruction is reached. However, many of the conditions that cause failures can not be diagnosed using breakpoint instructions, hence, the use of breakpoint instructions is of limited value.

A standard 386 microprocessor also includes four debug registers. The debug registers can store the addresses of memory locations. The addresses of the memory locations stored in the debug registers are termed "breakpoint addresses". Whenever a memory read or a memory write is made to one of the breakpoint addresses an exception signal is generated. When access to a breakpoint memory location is detected an exception handler program is invoked. The need to call an exception handler each time a breakpoint memory location is accessed makes the use of this facility very cumbersome and slow. Furthermore, the debug registers can only be used to set a breakpoint address which includes a 1, 2 or 4 byte memory location (i.e. a half word, a word, or a double word). Thus each debug register can be used to detect access to any location in, at most, a double word. With the present invention it is possible to detect access to any location within a relatively large block of memory.

The debug registers in a standard 386 "fault" I-O requests for access to "Instruction" addresses and "trap" requests for access to operand addresses. This makes the interpretation of results very complicated.

The present invention provides a much more powerful debugging mechanism than the debugging mechanisms previously available. The present invention is particularly useful when combined with the OEM mode described in the previously referenced publications and patent applications. With the mechanism provided by the present invention the activity in entire banks of I-O ports and entire ranges of memory locations can be monitored.

SUMMARY OF THE INVENTION

The present invention provides a microprocessor with a special Operation Capture Facility (OCF) mechanism which enables "faulting" whenever there is (a) a memory access request to any one of a specified plurality of blocks of memory (b) a request to access any one of a plurality of specified I-O ports or (c) any one of a specified plurality of interrupts is activated. This OCF mechanism includes a plurality of special registers which store either (a) an I-O port address, (b) a memory address or (c) an interrupt number. Mask registers are provided which (1) mask bits in the special register, thereby providing the ability to fault on an entire block of I-O access requests or upon activation of any one of a block of interrupts and (2) indicate which type of interrupts should be faulted and to indicate whether I-O requests should be faulted on a byte, word or double word access.

DETAILED DESCRIPTION OF A PREFERRED EMBODIMENT

The present invention is applicable to a wide variety of different microprocessors; however, the specific embodiment of the invention described herein specifically describes how the invention is applied in a 386 microprocessor. Furthermore, the specific embodiment shown herein describes the invention as applied in a 386 which includes OEM mode. It should be understood that while the present invention can take advantage of the OEM mode facility in a 386 microprocessor if such a facility is available, the present invention can also be used in a 386 or other microprocessor that does not have such a facility.

Figure 1:
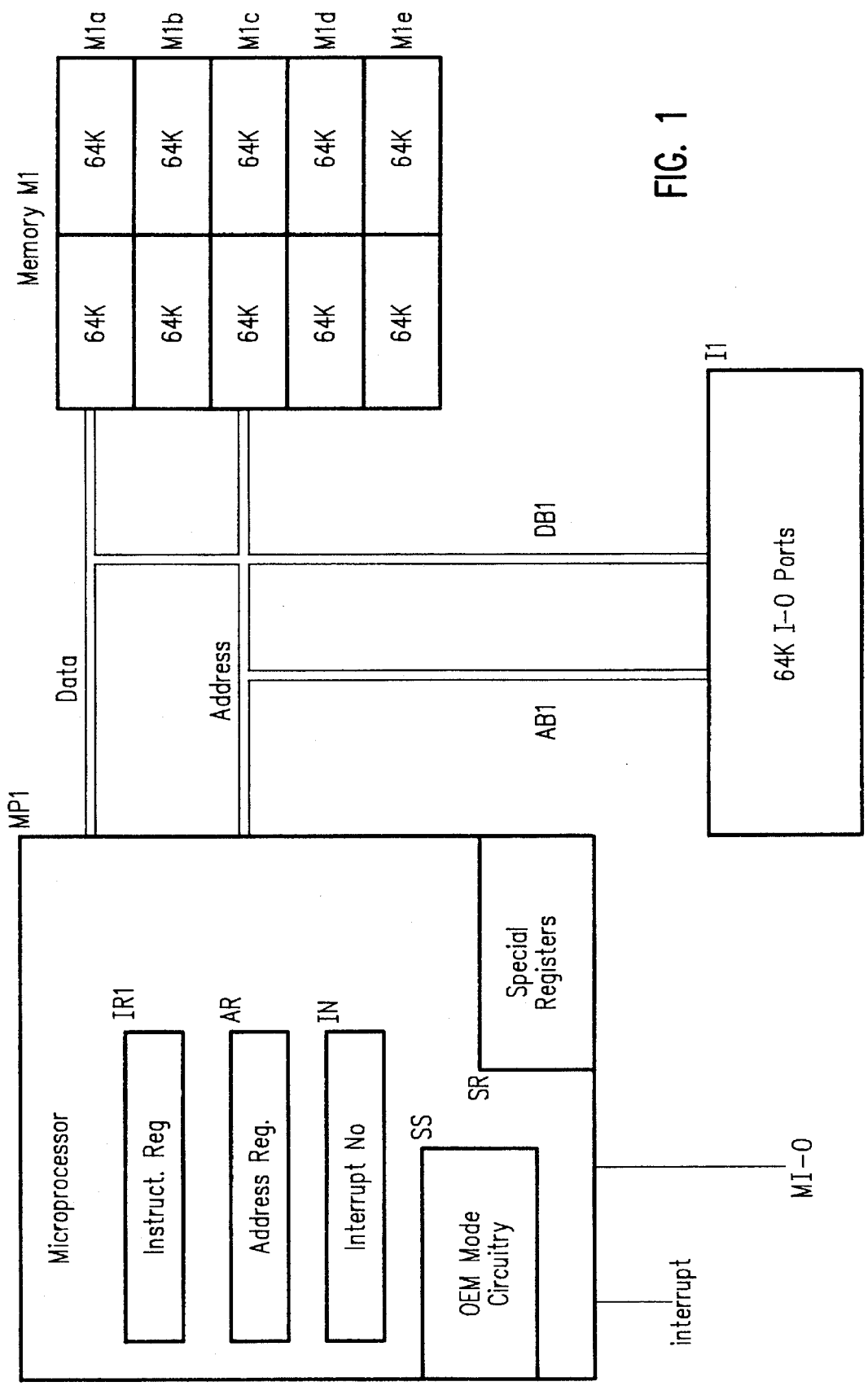
FIG. 1 shows a general block diagram of an overall system that includes an embodiment of the present invention.

FIG. 1 is an overall block diagram of a computer system that includes a single chip microprocessor MP1, a memory M1 and I-O ports I1. The microprocessor MP1 is connected to the memory M1 and to the I-O ports I1 by a data bus DB1 and by an address bus AB1. The microprocessor MP1 includes an instruction register IR1, an address register AR, a register IN which stores an interrupt number, OEM mode logic SS, and a number of special registers SR which will be described in detail later. Only two of the pins for the microprocessor are shown in FIG. 1 as the other pins are not particularly relevant to the present invention. Interrupt pin I and MI-O pin are shown. It is noted that the microprocessor MP1 is conventional except for the special registers SR and the associated special circuitry which will be described in detail hereinafter. The OEM mode circuitry SS is described in the above referenced patent applications and in the publicly available documents hereinafter cited.

For the purpose of discussing the present invention, one can consider the memory 12 as being organized into 64K blocks as shown by representative blocks M1a, M1b, M1c, etc. Each of these blocks can be addressed by the sixteen high order bits on the address bus. The I-O address space only has 64K and it can thus be addressed by a 16 bit address. The memory 12 is in fact continuous and the division into 64K blocks is essentially fictitious or transparent; however, it is noted that various devices such video buffers use 64K blocks of memory and as will be explained later in the embodiment of the invention shown herein the invention is used to monitor the activity in a memory block which has a 64K size.

The special registers SR shown in FIG. 1 are used to store either:

1) The address of several 64K blocks of memory, and
2) The addresses of I-O ports (plus a mask which allows one to mask bits in the I-O port address thereby making it possible to specify blocks of I-O ports rather than individual I-O ports).
3) Interrupt numbers.

The following are the functions performed by the specific embodiment of the invention shown herein: With the present invention it is possible to generate a "fault" (that is, it is possible to stop the normal operation of the system and go into an OEM mode) whenever, the system does any one of the following.

1) Makes access to any location in one of the specified 64K blocks of memory, the address of which has been stored in one of the special registers SR.
2) Accesses the ports whose address has been stored in one of the special registers SR.
3) One of the interrupts whose number has been stored in one of the special registers SR is activated.

A special mask register (shown in FIG. 3) is associated with the special registers SR that stores port addresses or interrupts numbers. This special mask register stores a four bit number that indicates the number of bits that are to be masked out when the address in the associated register is used. When a mask is used instead of generating a fault when one I-O port is accessed, a fault is generated whenever any port in an entire block of ports is accessed.

The special mask register also contains a bit which indicates if the faulting should be on an exclusive or inclusive basis, that is, whether (1) a fault should be generated when an instruction is executed which accesses a specified port (or block of ports), or (2) if the fault should be generated when an I-O instruction is executed which accesses a port other than the specified port (or block of ports). These two types of operation are termed "inclusive" and "exclusive" capture. While the use of inclusive and exclusive operation was described with respect to I-O port addresses, it should be understood that it also applies to memory accesses and interrupts.

The present invention can be used to monitor the operation of the system and to capture the fact that certain I-O operations, memory access request, or interrupt operations are about to occur. The operations that are done when an I-O operation, memory access or interrupt is faulted can be as simple as counting the occurrence or it can be more complex. For example in a computer with a back lighted LCD screen, the 64K block of memory that forms the video buffer memory can be monitored. The system can be programmed to go to OEM mode and to reset a continuously running timer each time the video buffer memory is accessed and the screen is updated. If the video buffer is not accessed within a specified period, the continuously running timer times out and activates a program which turns off the display back light thereby conserving power.

Forcing the system to fault each time a particular I-O is accessed can be used to virtualize I-O. Since the present invention causes a "fault" (which stops operation before execution of an instruction begins) rather than a "trap" (which stops execution after or during the execution of an instruction) the invention can be used to intervene each time the system tries to write or read from a particular port. Each time the system tries to write or read to a particular port the system can be forced into OEM mode and a OEM mode routine can provide the data or accept the data in the same way that it would be done by an I-O device. Thus, I-O devices are easily emulated or virtualized The above are only simple examples of how the present invention can be advantageously used. Many more applications for the present invention can be developed.

Figure 2:
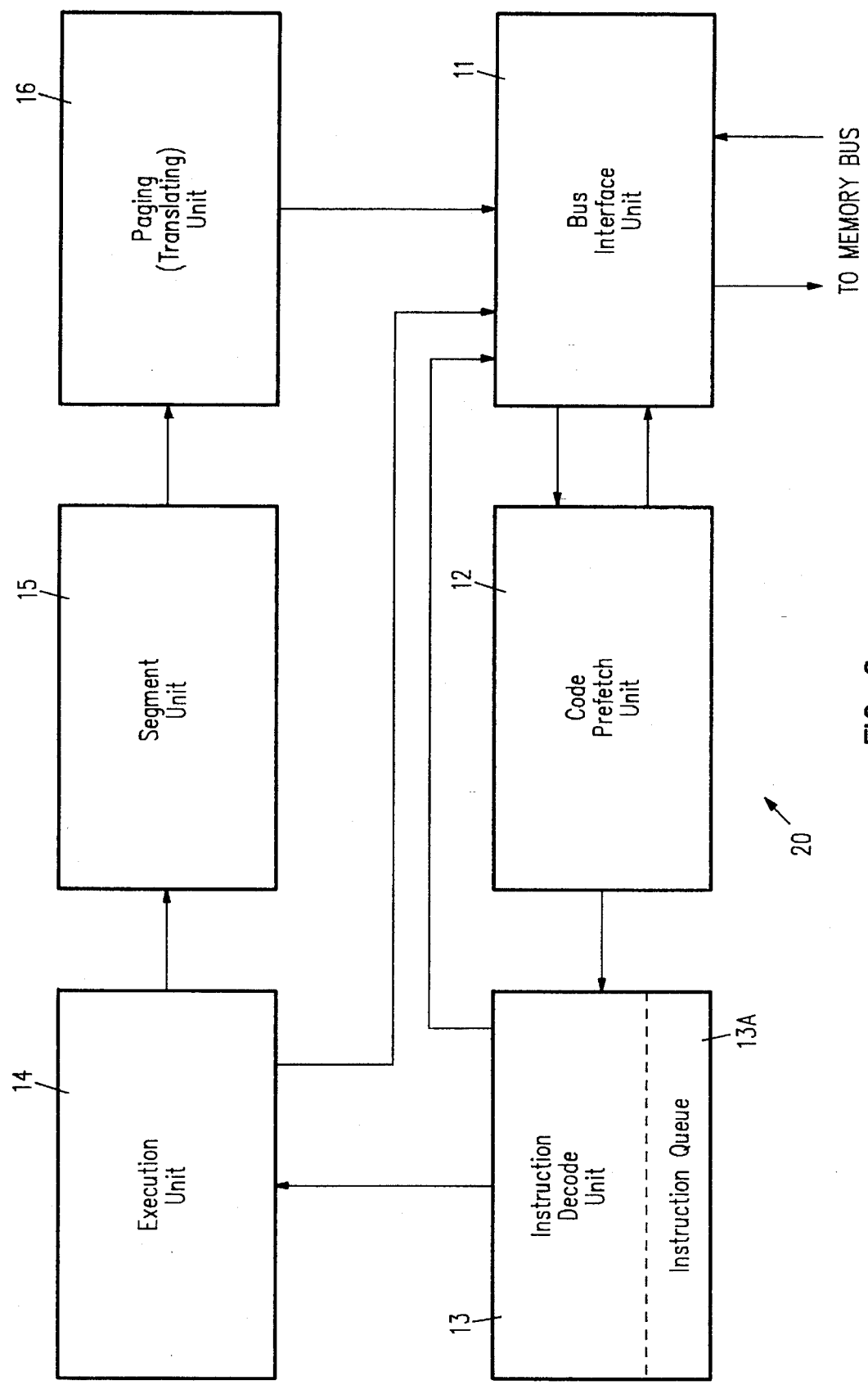
FIG. 2 is a block diagram of a 386 microprocessor shown in FIG. 1.

The invention will now be explained as applied to a 386 microprocessor: FIG. 2 shows the overall organization of the conventional units in the 386 microprocessor MP1. There are six basic units that are conventional, namely, a bus interface unit 11, a code prefetch unit 12, a instruction decode unit 13, an execution unit 14, a segment unit 15, and a paging unit 16 (which is sometimes referred to as a translating unit).

The present invention does not require any changes or modifications in the 386 architecture as that architecture is described in the various reference manuals that are available for the 386. The present invention provides additions to the standard 386 architecture in the same way that OEM mode provides additions to the standard 386 architecture. All programs that conform to the requirements for 386 programs (i.e. all programs that run on a normal 386 system) will operate on a system that includes the present invention. The present invention provides special features that can for example be used by an OEM manufacturer to implement power saving techniques, or which can be used by a programmer to facilitate program debugging. Basically the present invention provides a facility which can be used by programmers to implement special operations; however, the present invention does not interfere with the normal execution of normal 386 programs by a 386 user. Thus, the conventional 386 units shown in FIG. 2 operate in a conventional manner. The additional circuitry which embodies the present invention will be explained later with respect to FIGS. 3 and 4.

The conventional 386 units shown in FIG. 2 perform the following operations: The bus interface unit 11 provides a connecting link between the 386 microprocessor and the other elements in the system. All memory and I-O operations are handled by the bus interface unit 11. The code prefetch unit 12 insures that instructions are ready and available when they are needed by the instruction decode unit 13. When the instruction decode unit 13 receives instructions, it determines what type of instruction it has received and what type of data will be required for execution of the instruction. It requests any needed data from the bus interface unit 11. The instruction decode unit 13 includes an instruction queue 13A which provides a series of instructions which are ready for execution by the execution unit 14.

The execution unit 14 performs the computations needed to carry out each instruction. The execution unit 14 can send data directly to the bus interface unit 11. The segment unit 15 translates logical addresses into linear addresses and the paging unit 16 translates linear addresses into physical addresses. The function and organization of these units are explained in many publicly available references such as the following books, "Intel's Official Guide to 386", 1991 by Michael Edelhart, published by Osborne, McGraw-Hill, or "Advanced 80386 Programming Techniques" by James L. Turley, published by Osborne Mc Graw Hill, 1988, or "386

DX Microprocessor Hardware Reference Manual" published by Intel Corporation 1990.

Figure 3:
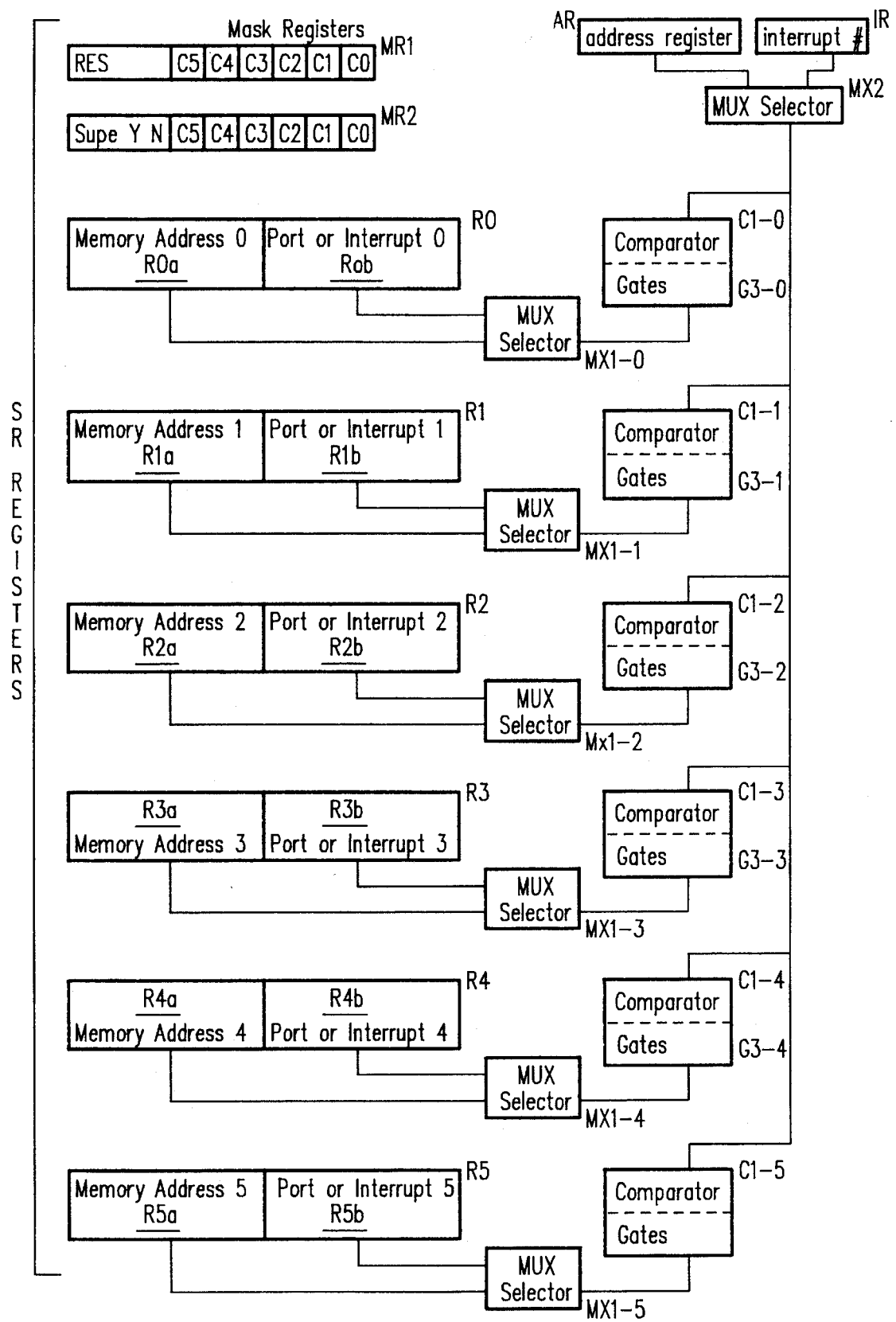
FIG. 3 is a block diagram of the special circuitry which provides an embodiment of the present invention.

FIG. 3 is a block diagram of the specific circuitry that implements the present invention. The circuitry includes six 32 bit registers R0 to R5. Each of these registers has two sections, one section stores a sixteen bit memory address (i.e. the address of one of the 64K blocks of memory) and the second section stores either the address of one of the 64K I-O ports or the number of one of the interrupts. The sections of registers R0 to R5 that store memory addresses are designated R0a to R5a and the sections of registers R0 to R5 that store port numbers or interrupt numbers are designated R0b to R5b.

There are two mask registers MR1 and MR2, each of which has a section associated with each of the registers R0 to R5. For example, section C0 is associated with register R0, section C1 is associated with register R1, etc. Each section in mask registers MR1 and MR2 is four bits long. Thus, for example register R0 has four associated bits in register MR1 and four associated bits in register MR2.

The bits in register MR1 indicate what type of interrupt or I-O should be faulted. The types allowed are as follows:

0000—Reserved—no function

0001 Generate fault if I-O instruction is a byte size I-O

0010 Generate fault if I-O instruction is a word size I-O

0100 Generate fault if I-O instruction is a D-word I-O

1001 Capture external interrupt

1010 Capture interrupt instruction

1100 Capture an "exception" i.e. internal interrupt

1000 Reserved

Thus, for example by setting the C0 bits in register MR1 to 0001, a fault will only be generated if the port specified in R0b is accessed by an I-O instruction that calls for a byte sized operation.

The four bits in register MR2 that are associated with each of the registers R0 to R5, store a number which indicates how many low order bits in the associated I-O port address in R0b to R5b are to be masked. For example if the C0 bits in register MR2 are set to "0011", (i e the binary number "3"), the three low order bits in register R0b will be masked and when a value stored in register R0b is used. The address in register R0b with the three low order bit masked will thereby specify a block of eight I-O ports and a fault will be generated whenever any one of the ports in this block of eight ports is accessed.

It should be noted from the above list of types, that the high order bit in the type field in register MR1 indicates if the number stored in register R0b is a port address or an interrupt number. This high order bit controls whether MUX Selector MX2 gates an interrupt number from register IR or an address from register AR to comparators C1-0 to C1-5.

As shown in FIG. 3, each of the registers R0 to R5 has an associated comparator C1. For example comparator C1-0 is associated with register C0. The following description will relate specifically to the circuitry associated with register R0; however, it should be understood that similar circuitry is associated with each of the registers R0 to R5. MUX Selector MX1-0 gate the contents of either section R0a or R0b to the comparator C1-0 and the Decode and gate circuit G3-0. This gating is dependent upon the nature of the instruction being executed and upon whether an interrupt has been asserted. The comparator C1-0 compares the contents of either the "a" or the "b" section of register R0 to the contents of either address register AR or interrupt number register IR. Mask decode circuitry and Gates G3-0 are controlled by contents of the C0 field in the mask register MR2. The contents of the C0 field is a number which indicates the number of bits from the register R0 which are masked during the comparison operation. The gates G3-0 selectively determine how many bits will be compared by the comparator C1-0. Alternatively, the comparator C1-0 can compare the entire address and the gates G3-0 can disable the output from some of the bit locations in the comparator C1-0.

Figure 4:
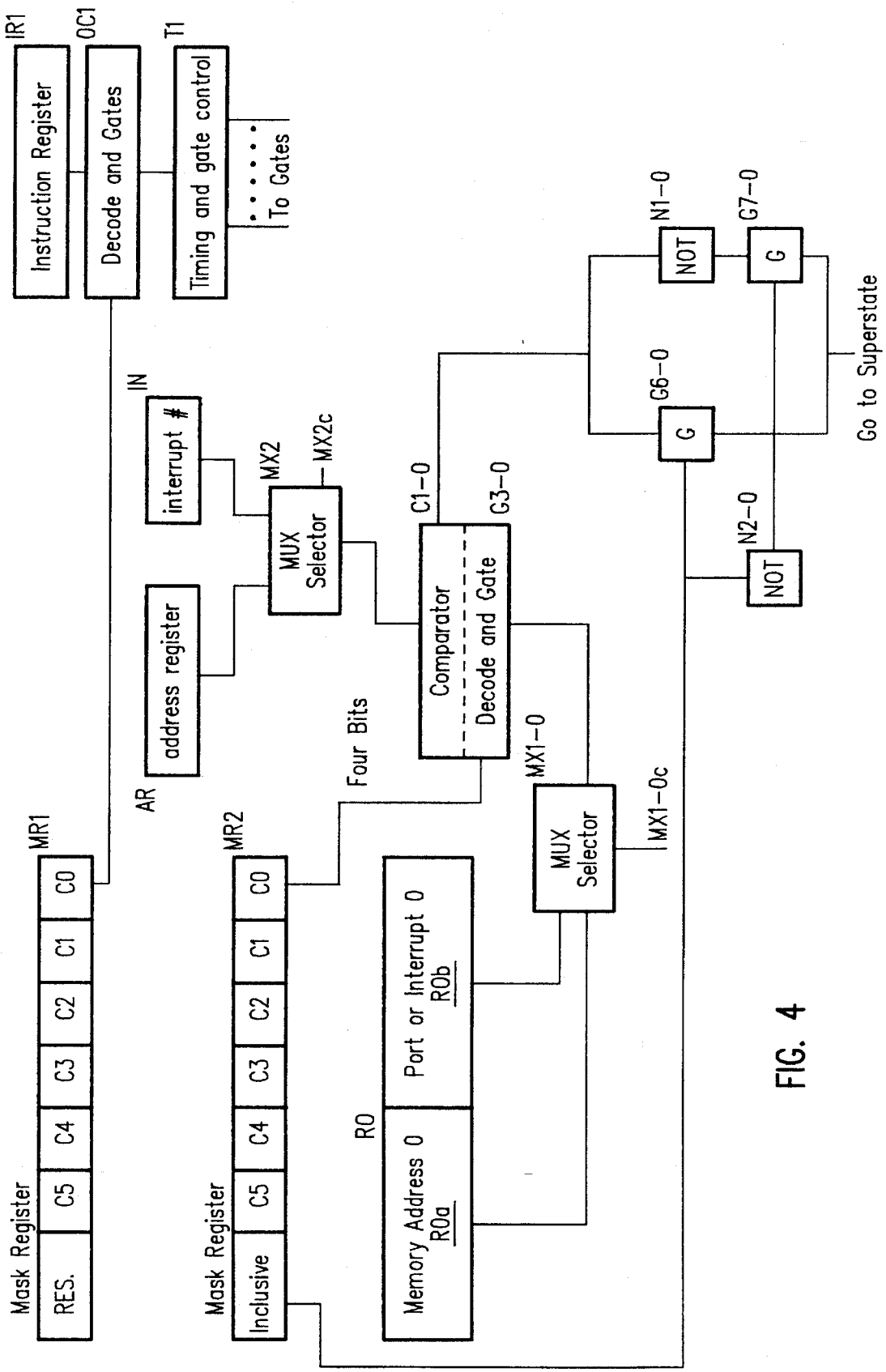
FIG. 4 is a more detailed diagram of one part of the circuitry shown in FIG. 3.

FIG. 4 is a more detailed diagram of the circuitry associated with register R0. While only the circuitry associated with register R0 is shown in FIG. 4, it should be understood that there is similar circuitry associated with each of the registers R1 to R5.

The MUX Selectors MX2 and MX1-0 have associated control lines MX2c and MX1-0c which control the operation of these multiplex selectors. These control lines are controlled by conventional timing and control circuitry T1. Decode and gate circuit DC1, decodes the instruction OP code in the instruction register IR1 and activates the timing and gate control T1 when an I-O instructions is detected in Instruction register IR1. The data in field C0 of register MR1 is in part used to determine which instructions will activate circuit T1. The outputs from timing and gate circuitry T1 is controlled by whether or not an interrupt has been asserted.

Depending upon which gates are activated in MUX Selectors MX1-0 and MX2, the comparator C1-0 compares:

1) Either the contents of address register AR or the contents of interrupt number register IN, with 2) The contents of either register R0a or R0b.

The number of bits that are actually compared, that is, the number of bits that are not masked off during (or after) the comparison is controlled by the contents of the C0 field of register MR2.

The field labeled "inclusive" in register MR2, determines if the comparison is on an exclusive or on an inclusive basis. That is, if the bit is set to "1", the system will go to OEM mode each time (a) the system accesses a port or interrupt indicated by the number in register R0b or (b) the system accesses a memory location indicated by the memory address in register R0a. If the bit is set to zero, the system will go to OEM mode each time an I-O port, interrupt or memory location other than that indicated by the stored number is accessed. It should be understood that while the above refers to a number or address in registers R0a or R0b, the system goes to OEM mode not only dependent on the specific number but upon this number as masked by the contents of register MR2. The inclusive or exclusive mode of operation is controlled by NOT circuits N1-0 and N2-0 and Gates G6-0 and G7-0.

The registers MR1, MR2, and R0 to R5 are loaded by conventional microprocessor instructions. The particular instructions which load these particular registers can be identical to the normal 386 instructions used to load general registers, merely modified to the extent necessary to load information in these particular registers. The instruction decode logic is such that these instructions are only operable when the processor is in OEM mode.

The timing circuitry is conventional. The only modification necessary to the normal 386 instruction timing is that after an instruction is decoded, and prior to its execution, the timing and gate controls T1 would cause the comparison herein described to be performed. Likewise when an interrupt is asserted a comparison is performed.

The particular operations which are performed when the invention switches to OEM mode form no part of the present invention. As previously described this could be for the purpose of conserving power or it could be for various tracking purposes. The invention is applicable to a wide variety of uses and the scope of applicant's invention is not limed to the specific uses which are described herein in that other uses for the invention can be readily developed.

While the invention has been shown as applied to a 386 microprocessor, it should be understood that the invention could be applied to other types of microprocessors. Also while the invention has been shown as a means for switching the processor to OEM mode, the same signal could be used to activate some type of interrupt or to switch the processor to some other state.

While the invention has been shown and described with respect to a preferred embodiment thereof it should be understood that various changes can be made in the application of the invention and the applicant is limited only by the appended claims.

I claim:

1. In a single chip integrated circuit microprocessor which executes instructions in sequence and which has a plurality of I-O ports, said ports being addressed by I-O instructions that include a port address, said microprocessor having a special operating mode, the improvement which comprises an operation capture facility that includes in combination:

instruction means for indicating the instruction to be executed next in said sequence by said microprocessor, some of said instructions being I-O instructions that access I-O ports;

address means for indicating the address of a port which is to be accessed in response to an I-O instruction indicated by said instruction means;

special register means for storing a plurality of port addresses;

comparison means for comparing the contents of said special register means with the address of a port from said address indicating means;

means for causing said microprocessor to go to said special mode in response to the results of said comparison, wherein activation of said special mode can be made to occur upon accessing selected I-O ports; and means for storing mask indicia and for controlling said comparison means in response to said mask indicia, wherein activation of said special mode can be made to occur upon accessing any port in a block of I-O ports.

2. The system recited in claim 1 wherein said special register means includes means for storing a plurality of addresses of blocks of memory, and wherein said address means includes means for indicating a memory location being accessed.

3. The system recited in claim 1 wherein said microprocessor includes interrupt indicating means and said special register means stores interrupt numbers and said comparison means compares the interrupt number in said special register means with the interrupt indicated by said interrupt indicating means.

4. The system recited in claim 1 including means for storing an indication which indicates if said faulting is exclusive or inclusive upon a comparison, and means for actuating said means for causing in response thereto.

5. In combination with a single chip integrated circuit microprocessor which has an instruction register, a memory address register, and a plurality of I-O ports, said ports being addressed by I-O instruction that places a port address in said memory address register, special register means for storing an I-O port address of one of said I-O ports, decoding means for decoding the contents of said instruction register to determine when an I-O instruction is ready for execution, comparator means operable after an I-O instruction is decoded and before it is executed, for comparing the address in said memory address register to the address stored in said special register means, and for faulting the execution of said instruction if said addresses match, mask storage means for storing a number indicating the number of bits which should be masked, means for masking the address stored in said special register, prior to said comparison, whereby said comparison only compares a selected number of high order bits of the address in said special register means to a selected number of high order bits of the address in said address, wherein a fault is generated if the address of said addressed I-O port falls within the block of addresses indicated by said masked address.

* * * * *